United States Patent [19]
Bell

[11] 3,740,711
[45] June 19, 1973

[54] SYSTEM FOR ENCOURAGING USE OF SEAT BELTS IN A MOTOR VEHICLE

[75] Inventor: Gregory E. Bell, Roseville, Mich.

[73] Assignee: General Motors Corporation, Detroit, Mich.

[22] Filed: Dec. 9, 1971

[21] Appl. No.: 206,403

[52] U.S. Cl............... 340/52 E, 180/101, 180/102, 340/278
[51] Int. Cl. .......... B60q 1/00, B60r 21/10
[58] Field of Search .......... 340/52 E, 278; 180/101, 102; 280/250 SB

[56] References Cited
UNITED STATES PATENTS
3,455,410  7/1969  Wilson .................. 180/102
3,074,055  1/1963  Rudolph et al .................. 340/52 E
3,215,221  11/1965  Rayman .................. 340/278

Primary Examiner—John W. Caldwell
Assistant Examiner—Glen R. Swann, III
Attorney—Eugene W. Christen, Creighton R. Meland and Albert F. Duke

[57] ABSTRACT

A warning system wherein a condition undesired by the vehicle operator is created if a seat belt is unfastened while the vehicle is in motion or, if a seat belt is fastened after the seat is vacated. In one embodiment the condition is an immediate signal light or sound. In another embodiment the condition is prevention of vehicle start.

3 Claims, 2 Drawing Figures

SYSTEM FOR ENCOURAGING USE OF SEAT BELTS IN A MOTOR VEHICLE

BACKGROUND OF THE INVENTION

This invention relates to warning systems for encouraging the use of seat belts during motor vehicle operation and more particularly to a circuit which creates an operator-undesired condition if a seat belt is unfastened while the vehicle is in motion or, if a seat belt is fastened after vacating the vehicle seat.

Various systems have been proposed in the prior art for encouraging use of seat belts by vehicle occupants by either providing a warning when the seat belts are not fastened and/or preventing starting of the vehicle until the seat belts are fastened. Exemplary of such systems is the patent to Farley, Jr. U.S. Pat. No. 3,449,714. In the Farley patent a normally closed seat belt switch and a normally open seat occupancy responsive switch are connected in series with a warning device and the vehicle battery through the ignition switch. When the seat is occupied and the seat belts are not fastened, the warning device is energized and in order to deenergize the warning device the seat belts must be fastened to break the circuit. Energizable with the warning device is a relay which interrupts the starter solenoid circuit unless the seat belts are fastened. While the Farley circuit provides an operator-undesired condition if vehicle occupants forget to fasten their belts, the Farley warning device and starter interrupt relay will be defeated if the seat belts are placed on the seat in a fastened condition. In this event, the circuit is broken at all times and the operator-undesired condition is not created even though the seat belt is not effectively in use.

It is an object of the present invention to provide an improved seat belt warning system of the type disclosed in the aforementioned Farley patent which includes means in the form of an operator-undesired condition for discouraging a situation where the seat belts are fastened after a seat is vacated.

It is another object of the present invention to provide a seat belt warning system that encourages the vehicle occupant to follow the sequence of occupying the seat, fastening his seat belts prior to placing the vehicle in motion, and maintaining the seat belts fastened at all times during motion of the vehicle.

SUMMARY OF THE INVENTION

These objects are accomplished in the present invention by creating a condition which encourages the vehicle operator to leave the seat belts in an unfastened state while the seat is unoccupied. The condition created is undesirable from the operator's standpoint and if not remedied, has an inhibiting effect on future vehicle operation (hence the expression operator-undesired condition). If the condition is remedied, the seat belts will be in an unfastened position at the time the seat is occupied. In one embodiment of the invention a warning device is continuously energized as long as the seat is vacated, placing a constant drain on the vehicle battery, if the occupant vacates the seat without unfastening his seat belts. This the operator does not desire and therefore avoids. Of course, if the occupant is restrained in the seat by the belt, the belt must be unfastened in order to vacate the seat and consequently, the condition is never created if the occupant is making proper use of the belts. On the other hand, if the belts have been fastened and placed on the seat where they are of no value in protecting the occupant during a collision, then the operator-undesired condition is created upon vacation of the seat. Since this condition is undesirable from the standpoint of future vehicle operation, the effect on the occupant and particularly on the vehicle operator of the anticipated condition tends to create a desirable circumstance upon subsequent vehicle operation; namely, the seat belts will be unfastened at the time of seat occupancy. If upon subsequent seat occupancy the belts are left unfastened the present invention provides in one embodiment, an audible and visual warning when the vehicle is placed in motion, and in another embodiment, prevents vehicle starting until the seat belts are fastened.

Since the present invention provides an operator-undesired condition, both at the beginning of a trip if the belts are unfastened and at the end of a trip unless the occupant unfastens the belts and leaves them unfastened when the seat is vacated, it is expected that the occupant will be encouraged to use the belts as an occupant restraint rather than going through the necessary belt fastening and unfastening procedures without any beneficial results.

Other objects as well as a more complete understanding of the present invention will become apparent from a reading of the following detailed description in conjunction with the drawings in which:

DETAILED DESCRIPTION OF THE DRAWINGS

Figure 1:
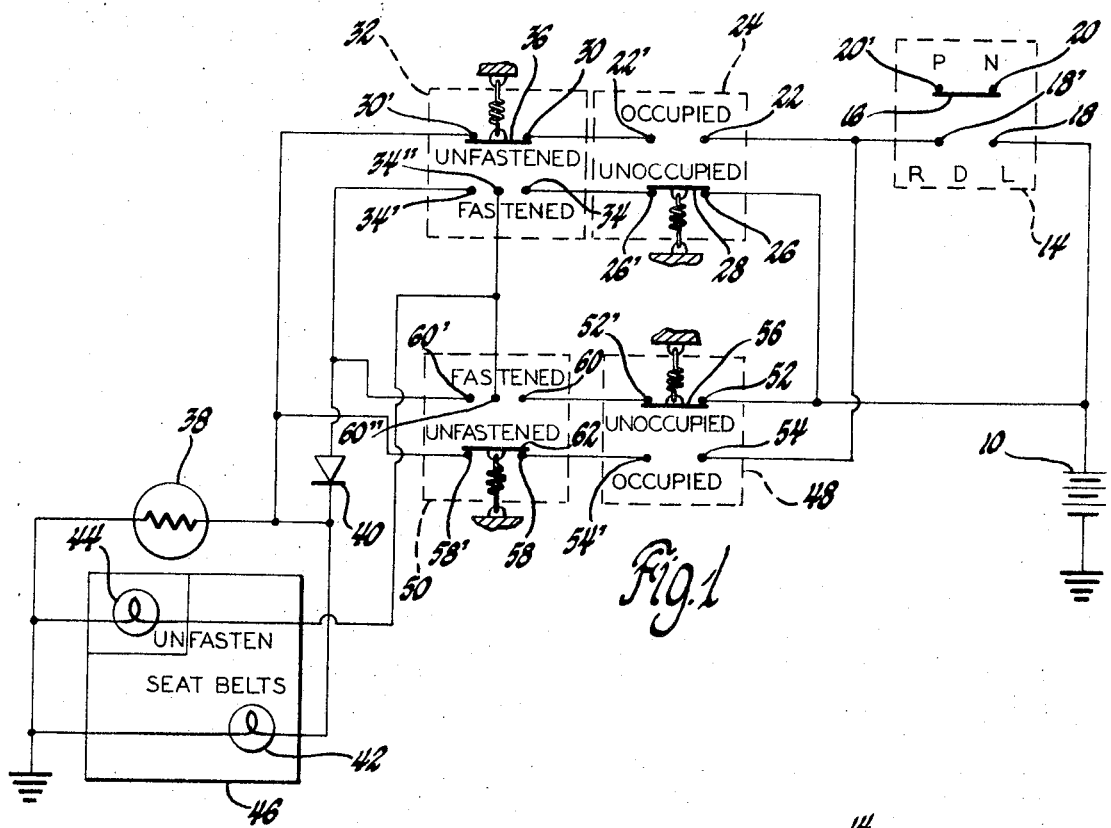
FIG. 1 is a schematic diagram of one embodiment of the present invention providing a warning if the seat belts are unfastened during vehicle motion or if the belts are fastened at the time the seat is vacated.

Referring now to the drawings and initially to FIG. 1, the system of the present invention includes a vehicle battery 10 providing a source of direct current. One side of the battery 10 is connected to ground while the other side is connected to a transmission selector switch 14. The switch 14 includes a movable contact 16 adapted to bridge a pair of stationary contacts 18 and 18' when the transmission selector is placed in either the reverse, drive or low position and break the contacts 18, 18' and bridge a pair of stationary contacts 20, 20' when the transmission selector is placed in either the Park or Neutral position. The contact 18 is connected to the battery 10 while the contact 18' is connected with one of a pair of stationary contacts 22, 22' associated with a seat occupancy responsive switch generally designated 24. The switch 24 is actuable by the driver of the vehicle and includes a second pair of stationary contacts 26, 26' which are normally bridged by a movable contact 28 to establish a first current conducting path when the seat is unoccupied. Whenever the seat is occupied the movable contact 28 is moved to a position bridging the contacts 22 and 22' to establish a second current conducting path.

The contact 22' is connected with one of a pair of stationary contacts 30, 30' associated with a seat belt in-use responsive switch generally designated 32 provided for use by the driver. The switch 32 also includes a trio of stationary contacts 34, 34' and 34'' which are bridged by a movable contact 36 whenever the seat belts are fastened to establish a third current conducting path. When the seat belts are unfastened the movable contact 36 bridges the stationary contacts 30 and 30' to establish a fourth current conducting path. The switch 32 may be responsive to fastening of the seat belt buckle or the extension of the belt from a suitable retractor. In any event actuation of the switch 32 is intended to be indicative of placing the seat belts in use.

The contact 30' is connected to a buzzer 38 or other suitable audible warning device and an indicator lamp 42. The contact 34' is also connected with the buzzer 38 and lamp 42 through a diode 40. The contact 34'' is connected to an indicator lamp 44. The other side of the buzzer 38 and lamps 42 and 44 are grounded. The indicator lamps 42 and 44 are suitably housed within an enclosure indicated by the solid lines 46 and are isolated one from the other so as to selectively illuminate characters conveying a message to the vehicle occupants. Preferably, the lamp 42 when energized alone illuminates the message "FASTEN SEAT BELTS" while energization of both the lamp 42 and the lamp 44 illuminate the message "UNFASTEN SEAT BELTS."

A second seat occupancy responsive switch generally designated 48 and a second seat belt in-use responsive switch generally designated 50 are actuable in response to occupancy of a seat by a passenger and to fastening of the passenger's seat belt. The switch 48 is identical with the switch 24 and comprises two pairs of stationary contacts 52, 52' and 54, 54' and a movable contact 56. The contacts 52 and 54 are connected respectively to the contacts 26 and 22 of the switch 24. The switch 50 is identical with the switch 32 and comprises a pair of stationary contacts 58, 58', a trio of stationary contacts 60, 60' and 60'', and a movable contact 62. The contacts 58', 60' and 60'' are respectively connected with the contacts 30', 34' and 34'' so that actuation of the switches 48 and 50 has the same effect on the buzzer 38 and lamps 42, 44 as actuation of the switches 24 and 32.

The operation of the circuit insofar as the driver actuated switches 24 and 32 are concerned is as follows: Assuming that the seat belts are unfastened at the time of occupancy of the driver's seat, the contacts 30, 30' are bridged by the contact 36 and upon occupancy of the seat the contacts 22 and 22' are bridged by the contact 28. Accordingly, after starting of the vehicle, placement of the transmission selector in a Drive position will energize the buzzer 38 from the source 10 through the contacts 18, 18' and 16 of the selector switch 14, the contacts 22, 22' and 28 of the switch 24 and the contacts 30, 30' and 36 of the switch 32. At the same time the lamp 42 is energized to illuminate the message "FASTEN SEAT BELTS." If the driver now fastens his seat belt the circuit to the buzzer 38 and the lamp 42 is broken and the contact 36 bridges the trio of contacts 34, 34' and 34''. If the driver's seat belts are unfastened while the seat is occupied and the selector switch 14 is in a Drive position the buzzer 38 and the lamp 42 will again be energized. However, at the end of a trip, placement of the transmission selector in either the Park or Neutral position will break the circuit to the buzzer 38 and lamp 42 so that normal unfastening of the seat belts at the end of the trip will not cause the buzzer 38 or lamp 42 to be energized.

Any attempt to defeat this system by maintaining a seat belt fastened at all times will result in energization of the buzzer 38 and the lamps 42 and 44 as soon as the driver vacates the seat. The buzzer 38 and lamp 42 will be energized directly from the source 10 through the contacts 34, 34' and 36 of the switch 32, the contacts 26, 26' and 28 of the switch 24 and the diode 40 regardless of the position of the transmission selector switch 14. At the same time the lamp 44 is energized from the contact 34'' so as to illuminate the message "UNFASTEN SEAT BELTS." The driver is thus discouraged from merely fastening the seat belts and leaving them on the seat and is encouraged to go through the sequence of fastening the seat belt subsequent to occupancy of the vehicle. Moreover, since the buzzer 38 and lamp 42 and 44 are continuously energized, a condition is created which is undesirable from the standpoint of the driver, namely, a continuous drain on the battery. This condition will undoubtedly encourage the operator to unfasten the seat belts.

The switches 48 and 50 operate the buzzer 38 and the lamps 42 in the same manner as the switches 24 and 32 respectively. The operation of the circuit with regards to passenger actions is identical with that previously described in connection with the driver's actions and further description is deemed unnecessary. The diode 40 is placed in the circuit to isolate the switches 32 and 50 to prevent energization of the lamp 44 when one of the switches 32 or 50 is fastened and the other of the switches 32 or 50 is unfastened.

Figure 2:
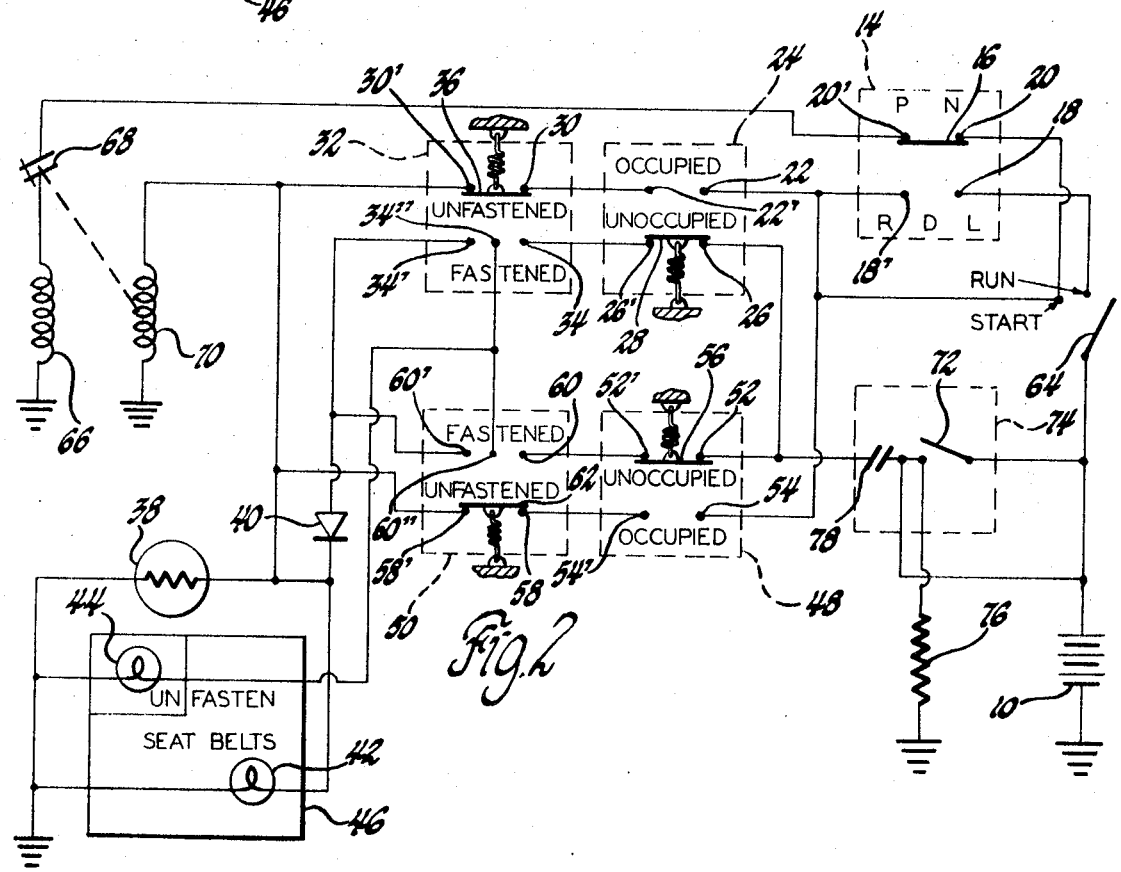
FIG. 2 is a schematic diagram of a second embodiment of the present invention including means for preventing starting of the vehicle while the seat belts are unfastened and also incorporating time delay means for extinguishing the warning under certain conditions.

Referring now to FIG. 2, the warning circuit for FIG. 1 has been modified to incorporate additional components for preventing starting of the vehicle until the seat belts are fastened. In FIG. 2 the circuit includes the conventional ignition switch 64. The ignition switch 64 is movable from a normally open position to a START position and biased to return from the START position to a RUN position. In the RUN position the ignition switch 64 connects the contact 18 to the battery 10 and in the START position connects each of the contacts 20, 22 and 54 to the battery 10. The contact 20' of the selector switch 14 is connected to a starter motor solenoid 66 of the vehicle through normally closed contact 68 operable by a relay coil 70. The relay coil 70 is connected between ground and the stationary contacts 30' and 58'.

The circuitry of FIG. 2 also includes a door switch 72 and a time delay device generally designated 74. The switch 72 is opened whenever the driver's door is closed and closes whenever the driver's door opens. The time delay device 74 includes a heater element 76 and normally open temperature responsive contacts 78. When current flows through the elements 76, the contacts 78 are heated and close. The contacts 78 open about 30 seconds after current flow ceases through the element 76. The switch 72 and time delay device 74 are interconnected between the battery 10 and the contact 26 and 52 for the purpose of preventing excessive drain on the battery 10 when the vehicle is unoccupied and any of the seat belts are fastened while still maintaining the feature of warning the driver when he vacates the seat of any fastened seat belts.

The operation of the circuit in FIG. 2 is as follows: When ignition switch 64 is placed in the START position, the relay 70 will be energized if the seat switch 24 is in the occupied position and the seat belt switch 64 is in the unfastened position. Energization of the relay 70 will break the contacts 68 and disconnect the starter solenoid 66 from the selector switch 14. At the same time the buzzer 38 and the lamp 42 will be energized to advise the driver to fasten his seat belt. If on the other hand, all of the seat belts are fastened when the ignition switch is placed in the START position, the relay 70 will remain deenergized and the starter solenoid 66 will be energized through the transmission selector switch 14 and the normally closed contact 68. After the vehicle is started and the ignition switch 64 is returned to the RUN position the warning circuitry of FIG. 2 operates the same as the previously described warning circuitry of FIG. 1 insofar as advising the driver or passengers to fasten their seat belts. Insofar as discouraging the continuous fastening of the seat belts whether the vehicle is occupied or not, the circuit of FIG. 2 operates somewhat differently than that of FIG. 1. If any of the seat belts are fastened at the time a seat is vacated, the opening of the door will cause the door switch 72 to close, passing current through the heater element 76, thereby closing the contact 78 and energizing the buzzer 38 and the lamps 42 and 44. The buzzer 38 and the lamps 42 and 44 will remain energized until the contacts 78 reopen which is preferably about 30 seconds after the vehicle door is reclosed to interrupt current flow through the element 76.

It will be apparent from the above that I have provided a seat belt warning system which encourages the vehicle occupants to maintain their seat belts fastened while the vehicle is in motion and conditions the occupants to follow the sequence of fastening the seat belts subsequent to seat occupancy and prior to placing the vehicle in motion by creating an operator-undesirable condition unless the seat belts are unfastened prior to vacating of the seat.

Having thus described my invention what I claim is:

1. A seat belt warning system for conditioning the operator of a motor vehicle to follow the sequence of fastening his seat belt prior to placing the vehicle in motion while also warning the operator if a properly fastened seat belt is unfastened while the vehicle is in motion, said system comprising:

a source of current, seat occupancy responsive switch means having a seat unoccupied position completing a first current conducting path and a seat occupied position completing a second current conducting path and movable therebetween in response to seat occupancy, seat belt responsive switch means having a belt fastened position completing a third current conducting path and a belt unfastened position completing a fourth current conducting path and movable therebetween in response to belt fastening, electrically energizable means effective, if energized when the vehicle transmission selector is not in a drive position and through a fifth current conducting path to create an operator-undesired condition, and if energized when the vehicle transmission selector is in a drive position and through a sixth current conducting path, to create an immediate warning signal without impeding vehicle operation, means connecting said source to said electrically energizable means through said first and third and fifth current conducting paths or in the alternative through said second and fourth and sixth current conducting paths.

2. A seat belt warning system for conditioning the operator of a motor vehicle to follow the sequence of fastening his seat belt prior to placing the vehicle in motion while also warning the operator if a properly fastened seat belt is unfastened while the vehicle is in motion, said system comprising:

a source of current, seat occupancy responsive switch means having a seat unoccupied position completing a first current conducting path and a seat occupied position completing a second current conducting path and movable therebetween in response to seat occupancy, seat belt responsive switch means having a belt fastened position completing a third current conducting path and a belt unfastened position completing a fourth current conducting path and movable therebetween in response to belt fastening, electrically energizable means effective, if energized when the vehicle transmission selector is not in a drive position to create an operator-undesired condition, and if energized when the vehicle transmission selector is in a drive position, to create an immediate warning signal without impeding vehicle operation, means establishing a series circuit from said source to said electrically energizable means in response to completion of said first and third current conducting paths and, means establishing a second series circuit from said source to said electrically energizable means in response to completion of said second and said fourth current conducting paths.

3. A seat belt warning system for conditioning the operator of a motor vehicle to follow the sequence of fastening his seat belt prior to placing the vehicle in motion while also warning the operator if a properly fastened seat belt is unfastened while the vehicle is in motion, said system comprising:

a source of current, seat occupancy responsive switch means having a seat unoccupied position completing a first current conducting path and a seat occupied position completing a second current conducting path and movable therebetween in response to seat occupancy, seat belt responsive switch means having a belt fastened position completing a third current conducting path and a belt unfastened position completing a fourth current conducting path and movable therebetween in response to belt fastening, a first indicator lamp for illuminating a "FASTEN SEAT BELT" message, a second indicator lamp for illuminating an "UNFASTEN SEAT BELT" message, means establishing a series circuit from said source to said first lamp in response to completion of said second and fourth current conducting paths, means establishing a series circuit from said source to said second lamp in response to completion of said first and third current conducting paths.

* * * * *